April 17, 1934.  F. ENNEKING  1,955,230
HAYMAKER
Filed Jan. 27, 1933

Inventor:
F. Enneking
By: Marks & Clerk
Attys.

Patented Apr. 17, 1934

1,955,230

UNITED STATES PATENT OFFICE 1,955,230

HAYMAKER

Fritz Enneking, Borringhausen, near Damme/Oldbg., Germany

Application January 27, 1933, Serial No. 653,907
In Germany February 9, 1932

4 Claims. (Cl. 56—370)

The invention relates to an haymaker, particularly for the spreading and turning haycocks.

It is known that haycocks can be spread only under difficulties, particularly if the hay is wet and formed into a ball. By using the known machines fitted with turning forks the hay gets easily caught in great balls so that the forks or the teeth run the risk of breaking.

The invention avoids these disadvantages by the fact that before the hay being spread by the turning forks it is submitted to a preliminary treatment. The nature of the invention consists in the arrangement of movable rakes before the turning forks, by which the haycocks are spread out, loosened and brought to the turning forks in a symmetrical thick layer. Advantageously the movable rakes extend beyond the width of track of the machine in order that a certain gripping of the haycocks is secured from both sides. In the middle of the machine the teeth of the movable rakes may be shorter. Thereby they make a passage for the hay so that the haycocks spread out and advanced to the middle of the machine are conveyed to the turning forks in a continual lay of equal thickness. Then the turning forks spread the hay to both sides in the known manner.

For the protection of the movable rakes and for an unhindered throwing movement fixed rakes may be arranged before the movable rakes, and have strong angularly bent teeth for effecting a proper gripping of the hay. At the movement the teeth of the movable rakes engage between the teeth of the fixed rakes and throw the gripped hay to the middle of the machine.

In the accompanying drawing a form of the invention is shown by way of example.

Figure 1:
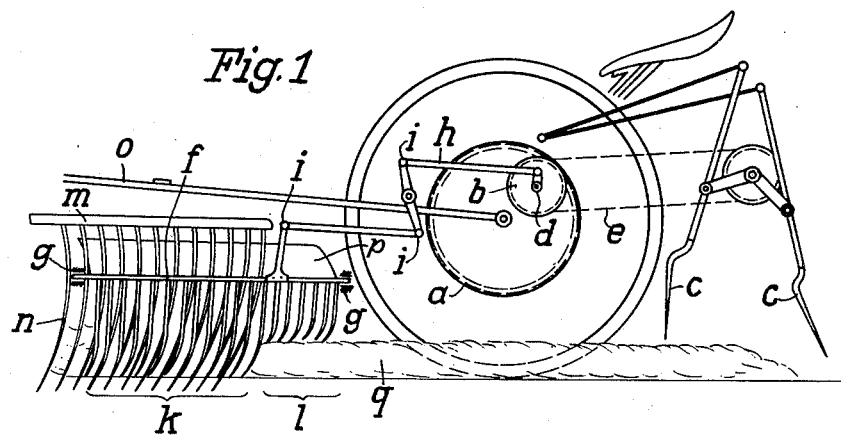
Figure 2:
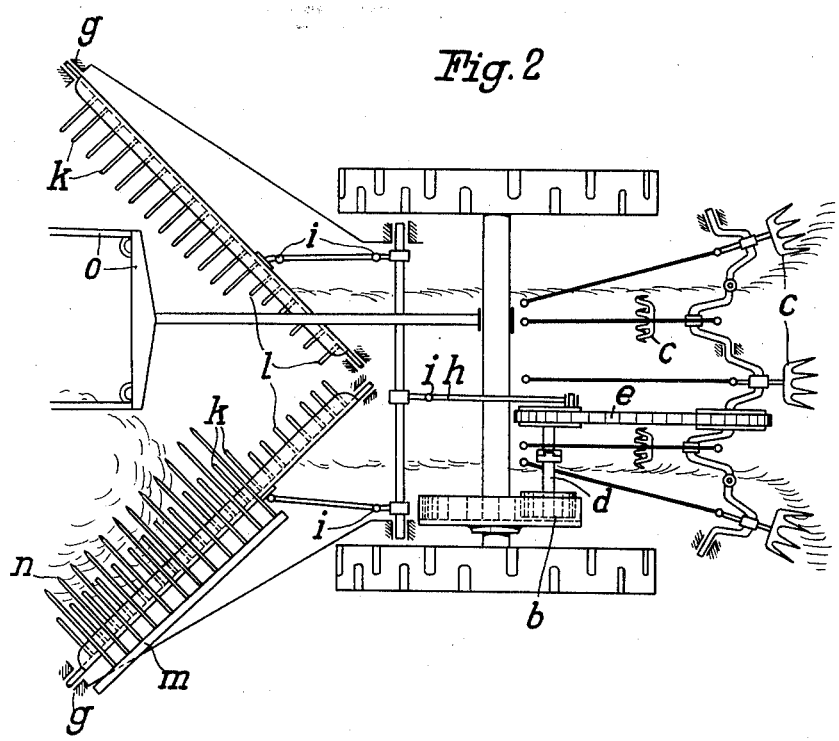

Fig. 1 is a side view and Fig. 2 shows a plan view.

The two toothed wheels $a$, $b$ driven by the wheel axle drive the turning forks $c$ by the intermediate shaft $d$ and the chain $e$ in the known manner. Rakes are provided in front of the carriage or frame with the turning forks and comprise stationary rakes $m$ and movable rakes $f$ which extend on both sides over the track of the carriage or frame. The movable rakes—throwing rakes $f$—are supported on both sides horizontally in bearings $g$. The thrusting movement of the rakes takes place over a crank rod $h$ and links $i$. The throwing rake is provided externally with long prongs $k$ extending to the ground while short prongs $l$ are provided internally which leave a slot $q$ for the swath to be delivered. Guiding plates $p$ are provided above the rake supporting rod $g$. The beam $o$ engages with the wheel axle of the machine and extends forwardly between rakes $m$, $f$. During their throwing movement, the prongs $k$ of the throwing rakes $f$ engage between the prongs $n$ of the stationary rake $m$.

What I claim is:

1. A haymaker comprising in combination a wheeled frame, rear turning forks provided on said frame, means for operating said turning forks from the machine-axle, movable rakes provided on and in front of the frame, supported by horizontal bearings and means for operating said movable rakes.

2. A haymaker comprising in combination a wheeled frame, rear turning forks provided on said frame, means for operating said turning forks from the machine-axle, movable rakes provided on and in front of the frame, supported by horizontal bearings and extending beyond the width of track of the wheels and means for operating said movable rakes.

3. A haymaker comprising in combination a wheeled frame, rear turning forks provided on said frame, means for operating said turning forks from the machine-axle, movable rakes provided on and in front of the frame, supported by horizontal bearings and extending beyond the width of track of the wheels, said rakes including teeth which are short at the center of the frame and long at the sides of the frame, and means for operating said movable rakes.

4. A haymaker comprising in combination a wheeled frame, rear turning forks provided on said frame, means for operating said turning forks from the machine-axle, movable rakes provided on and in front of the frame, supported by horizontal bearings and extending beyond the width of track of the wheels, means for operating said movable rakes and fixed rakes also provided on and in front of the frame and before the movable rake-frame.

FRITZ ENNEKING.